Oct. 10, 1939.   I. C. JENNINGS   2,176,002
HEAT CONTROL APPARATUS
Filed April 15, 1936   3 Sheets-Sheet 1
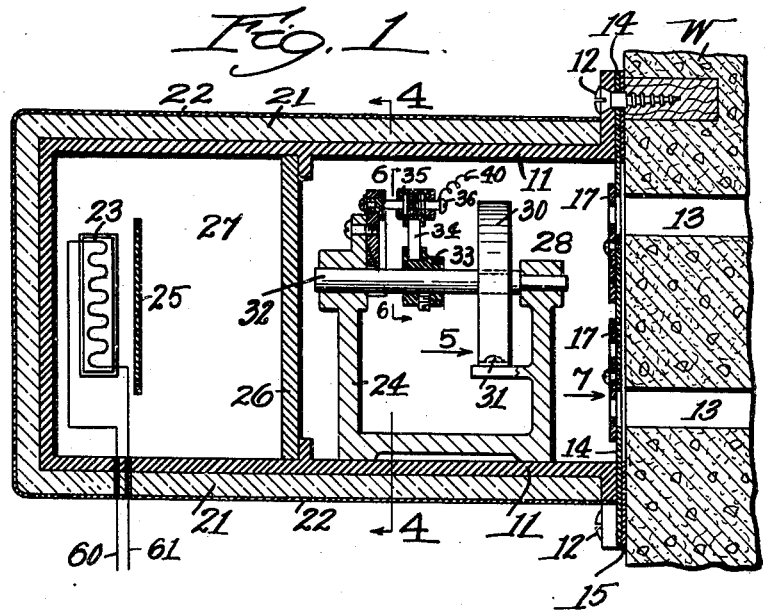
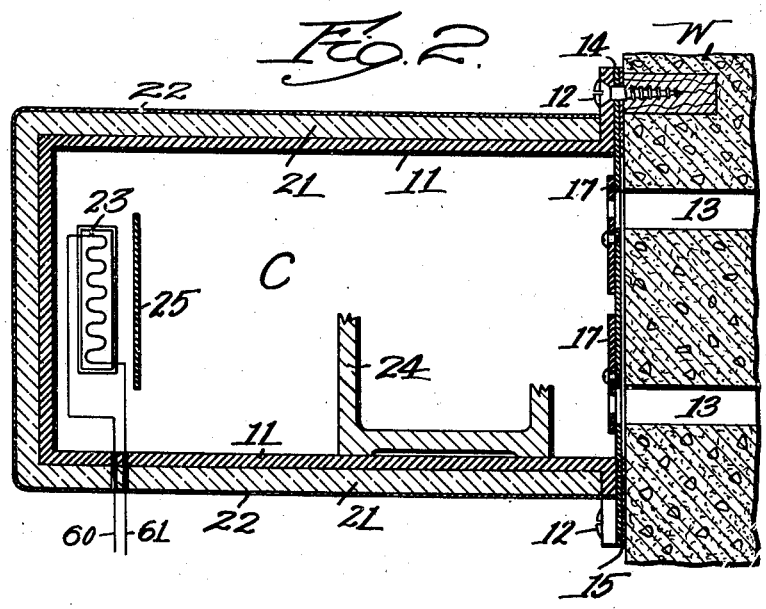
Inventor
Irving C. Jennings
by attorney
Chas. T. Hawley Oct. 10, 1939.  I. C. JENNINGS  2,176,002
HEAT CONTROL APPARATUS
Filed April 15, 1936  3 Sheets-Sheet 2
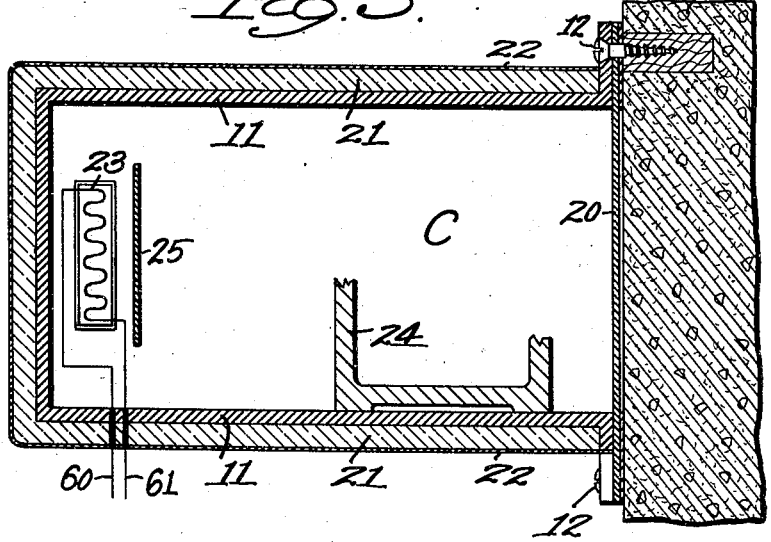
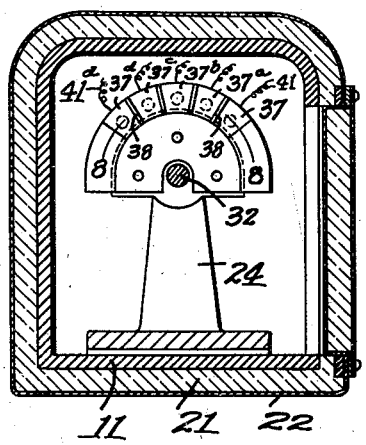
Inventor
Irving C. Jennings
By Chas. T. Hawley
Attorney

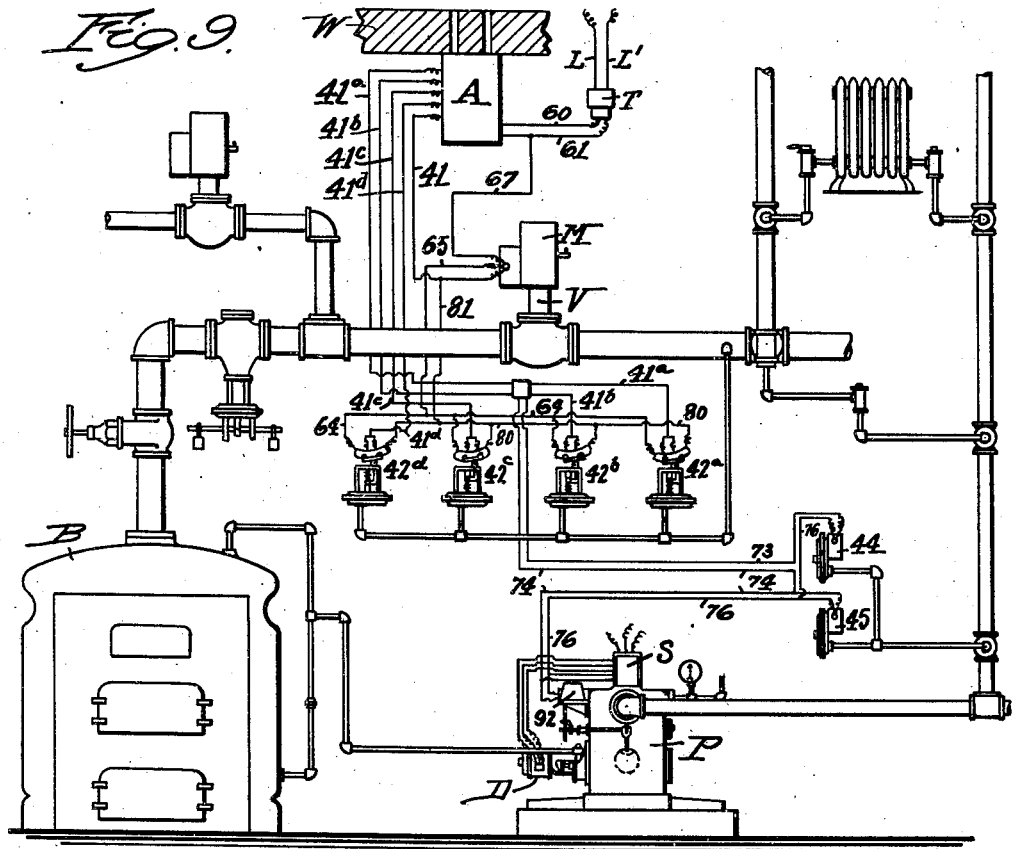
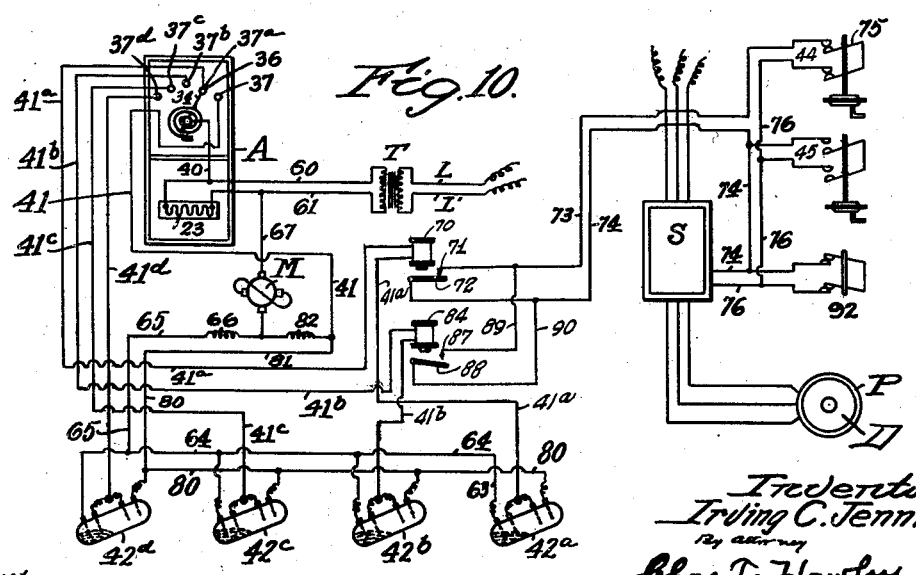

Patented Oct. 10, 1939

2,176,002

UNITED STATES PATENT OFFICE 2,176,002

HEAT CONTROL APPARATUS

Irving C. Jennings, South Norwalk, Conn.

Application April 15, 1936, Serial No. 74,516

6 Claims. (Cl. 236—91)

This invention relates to apparatus for regulating and controlling the temperature within a dwelling house or other building, and is an improvement on the apparatus of my prior application, Serial No. 38,256, filed August 28, 1935.

Whenever any attempt is made to maintain constant and uniform temperature within a building or similar structure, many and varying conditions must be taken into account. Among these varying conditions are the outside temperature; the direction and velocity of the wind; the prevalence of sunshine, snow or rain; the wetness or dryness of the outer walls of the building; and the prevalence of daylight or darkness; all of which varying conditions also produce varying effects in buildings of different types of construction.

A heat control apparatus which does not take into account these widely varying conditions will necessarily fail to maintain uniform temperature, and may occasion twenty-five to thirty percent variation from the predetermined standard.

It is the general object of my present invention to provide improved and simplified heat control apparatus which will automatically maintain a practically uniform, predetermined and comfortable temperature within a building, and which will avoid either overheating or underheating of the building, regardless of widely varying outside weather and temperature conditions.

A more specific object of my invention is to provide heat control apparatus which will automatically select and maintain such steam pressures as will balance the actual heat loss of a building under varying outside temperature and weather conditions.

I also provide heat control apparatus which is not affected in its operation by varying and temporary conditions within the building, such as the opening or closing of a door or window, or the lighting of an open fire.

My invention further relates to arrangements and combinations of parts which will be hereinafter described and more particularly pointed out in the appended claims.

A preferred form of the invention is shown in the drawings, in which

Fig. 1 is a sectional side elevation of my improved heat control apparatus, with a portion of a building wall also shown in section;

Fig. 2 is a similar sectional view, but showing a modified construction of the control apparatus;

Fig. 3 is a view similar to Fig. 2 but showing a further slight modification of the apparatus and showing the apparatus mounted on a wall of different construction;

Fig. 4 is a sectional end elevation, taken along the line 4—4 in Fig. 1;

Fig. 5 is a detail view, looking in the direction of the arrow 5 in Fig. 1;

Fig. 6 is a detail sectional view, taken along the line 6—6 in Fig. 1;

Fig. 7 is a side elevation of a detail part, looking in the direction of the arrow 7 in Fig. 1;

Fig. 8 is a sectional plan view, taken along the curved line 8—8 in Fig. 4;

Fig. 9 is a diagrammatic view of a vacuum steam heating system with which my heat control apparatus may be desirably used, and Fig. 10 is a wiring diagram for the heating system shown in Fig. 9.

My improved heat control apparatus is shown in detail in Figs. 1 to 8 inclusive and is indicated generally in Figs. 9 and 10 by the letter A.

Briefly stated, my invention relates to heat control apparatus adapted to be housed in a casing 11 which may be secured to the inner face of an exterior wall W by screws 12. In the preferred construction, the wall W is provided with one or more passages 13 extending through the wall from the outer face thereof and communicating with the interior of the casing 11.

Also, in the preferred form, a metal plate 14 and gasket 15 are inserted and secured between the casing 11 and the wall W, and manually adjustable discs 17 are rotatably mounted on the inner face of the plate 14. These discs 17 (Fig. 7) are provided with holes 18 of different diameters and with an imperforate portion 19.

To make the air leakage into the control chamber 28 correspond to the actual infiltration of the building under variable weather conditions, the discs 17 may be set in different angular positions, and the size of the openings between the passages 13 and the interior of the casing 11 may be thus adjusted, or the passages may be entirely closed.

In the construction shown in Fig. 3, a single imperforate plate 20 is substituted for the perforated plate 14 and discs 17 shown in Figs. 1 and 2.

The casing 11 is preferably provided with a heavy heat-insulating coating 21 and with a metal outer covering 22. Thus constructed, the interior of the casing 11 is substantially independent of the temperature of the room or building in which the control apparatus is mounted.

The interior of the casing 11 is provided at one end with a heating device 23, usually in the form of an electric resistance, and at the other end with circuit-shifting or control mechanism mounted on a base or frame 24.

A screen 25 is preferably positioned adjacent the heating device 23, so as to protect the control mechanism from direct heat radiation. A partition 26 may also be provided between the heating device 23 and the control mechanism, said partition dividing the casing 11 into a reference chamber 27 and a control or regulating chamber 28.

The partition 26 will be of such thickness and of such material as will permit only a slow transfer of heat between the chambers 27 and 28. In the modified construction shown in Figs. 2 and 3, the partition 26 is omitted, and the casing 11 encloses a single chamber C only.

The circuit-shifting or control mechanism which is mounted on the base or frame 24 may be of any suitable thermal-responsive type, but is shown in the drawings as comprising a bimetallic spring 30 (Fig. 5) having one end secured by a screw 31 to a fixed lug on the frame 24 and having its other end secured to a rotatable shaft 32 (Fig. 1). A hub 33 is mounted on the shaft 32 and has a slightly resilient contact arm 34 (Fig. 6) which in turn supports a head 35, preferably of non-conducting material. The head 35 has a spring-pressed plunger 36 mounted in a recess therein, which plunger selectively engages a series of contact plates 37, 37$^a$, 37$^b$, 37$^c$ and 37$^d$ (Fig. 4).

The contact faces of these plates are preferably concave as shown in Fig. 8, and the end of the plunger 36 is convex, so that the plunger will not readily remain on one of the narrow insulating strips 38 which separate the plates 37 but will always make contact with some one of the contact plates.

A wire 40 is connected to the right-hand end of the plunger 36 (as viewed in Fig. 1) and a series of wires 41, 41$^a$, 41$^b$, 41$^c$ and 41$^d$ are connected to the plates 37, 37$^a$, 37$^b$, 37$^c$ and 37$^d$ respectively.

While my improved heat control apparatus is capable of use with any desired form of heating apparatus, I have indicated in Figs. 9 and 10 the application of my invention to a vacuum type steam-heating system comprising a boiler B, one or more electric motorized valves V and a plurality of pressure-operated selective control devices 42$^a$, 42$^b$, 42$^c$ and 42$^d$ which may correspond respectively to 20″, 10″, and 5″ of vacuum and to a pressure of one pound respectively and which are connected by the wires 41$^a$, 41$^b$, 41$^c$ and 41$^d$ to the control apparatus A. The heating system disclosed also embodies a vacuum and condensation return pump P, a high vacuum controller 44 and a low vacuum controller 45 for the pump P, and starting apparatus S for the pump P.

The controllers 44 and 45 are provided for maintaining either a high vacuum or a low vacuum in the return side of the heating system and maintain such vacuums by causing the vacuum pump P to operate whenever the desired high or low vacuum in the system is impaired.

For a more complete description of the vacuum heating system herein disclosed, reference is made to my prior Reissue Patent No. 15,637 and for a more complete description of the pressure-operated selective control, reference is made to my pending application Serial No. 754,674, filed November 24, 1934.

The detailed coaction of the control apparatus A with the vacuum steam heating system shown in Figs. 9 and 10 will be hereinafter described, but it should be understood that the disclosed heating system and its component parts form no part of my present invention, except as certain parts at times cooperate with my improved heat-control apparatus.

The general operation of my improved heat control apparatus is as follows:

The control or regulating chamber 28 of the heat control apparatus A is in contact with the outer wall W of the building and, in the construction shown in Figs. 1 and 2, the chamber 28 communicates with the atmosphere through the open passages 13. The freedom of communication may be varied by changing the setting of the discs 17, and the passages 13 may be entirely closed by the imperforate portions 19 of the discs if so desired.

The temperature in the outer portion of the control chamber 28 thus responds quite directly to variations in external weather or temperature conditions, while the temperature at the heated end of the reference chamber 27 is maintained substantially constant and at a desired predetermined temperature by the constantly and uniformly energized heating device 23, which is of such capacity that the temperature adjacent thereto is only slightly affected by the usual temperature changes at the remote end of the chamber 28. Such slight change as occurs may be offset by suitable calibration of the heat control apparatus.

There is a slow but continuous interchange of heat between the chambers 27 and 28 through the partition 26, this interchange being dependent on the temperature differential between the remote ends of the chambers, which corresponds to the differential between the desired internal temperature of the building and the existing external temperature and weather conditions.

The thermostat 30 is designed to move the arm 34 and contact plunger 36 to "off" position when the control chamber 28 is substantially at the temperature of the reference chamber 27. If the control chamber 28 is at a lower temperature than that of the reference chamber 27, the arm 34 and plunger 36 will be moved by the thermostat 30 to a position to supply more heat to the building, and the lower the temperature in the chamber 28, the further the arm and plunger will be moved and the more heat will be supplied.

When my improved control apparatus is in use, the control chamber 28 is affected by external temperature and weather conditions of all kinds, but neither chamber responds to local temperature variations in the building, by reason of the heavy heat-insulating coating 21.

In mild weather when the temperature in the control chamber 28 is only slightly less than that in the reference chamber 27, the plunger 36 will be in the "off" position the greater part of the time. As the severity of the weather or its unfavorable characteristics increase, increased heat will be supplied.

While the provision of the partition 26 is considered desirable as effecting a slower and more gradual interchange of heat between the reference chamber 27 and the control chamber 28, many of the advantages of my invention will be achieved by use of the construction shown in Fig. 2, in which a single combined reference and control chamber C is used.

With this construction, the temperature of the portion of the chamber C adjacent the outer wall W will tend to fall below that of the portion adjacent the constant heating device 23, and the thermostat coil 30, being in the portion adjacent the outer wall, will call for more heat as the temperature in that portion of the chamber falls, the general operation being substantially similar to that in the previously described construction but being possibly a little less quickly responsive to changes in external conditions.

In the construction shown in Fig. 3, the passages through the wall W and the openings in the end plate 20 are also omitted. This form of my invention is easier to install, as no passages through the outer walls are required, but the omission of the passages and openings probably also has the effect of reducing the rapidity of response to changes in external temperature, wind or other weather conditions.

A brief statement of the operation of my invention as applied to the vacuum steam heating system shown in Figs. 9 and 10 is herewith presented, so that the operation of my invention under actual working conditions in one type of heating installation may be more clearly understood.

Line wires L and L' (Figs. 9 and 10) are connected to a step-down transformer T and secondary wires 60 and 61 connect the transformer T to the heating coil or resistance 23 in the control apparatus A.

A branch wire 40 connects the wire 60 to the plunger 36 (Fig. 1) on the arm 34, which plunger is shown as having just advanced from the "no-heat" contact point 37 to the contact point 37ª which corresponds to a 20" vacuum in the heating system and to a very low rate of heat dissipation. The contact point 37ª is connected through a wire 41ª to the mercury switch device 42ª, which is one of the devices which control the steam pressure on the supply side of the heating system.

The circuit is continued from the pressure-controlled mercury switch device 42ª through the wires 63, 64 and 65 to a coil 66 which is one of the field coils of the split field motor M which operates the motorized valve V (Fig. 7). This field coil 66 acts to open or partially open the valve V.

The circuit is continued through the brush gear and commutator of the motor M and through a wire 67 to the secondary return wire 61 which leads back to the transformer T.

When this circuit is closed and rendered operative by engagement of the plunger 36 with the contact 37ª, the energizing of the field coil 66 causes the motor M to rotate in a direction to open the valve V in the main steam line.

A solenoid 70 is inserted in the wire 41ª previously described, and passage of current through the wire 41ª and solenoid 70 causes engagement of contacts 71 and 72, thus closing a connection between wires 73 and 74.

The wire 73 is connected to one side of a double pole switch 75 in the high vacuum controller 44. The second side of the double pole switch 75 is connected to a wire 76 which in turn is connected to a line wire in the magnetic starter S of the vacuum and condensation-return pump P.

The starter control circuit is then complete, as the wire 74 is continuously connected to a second line wire in the starter S. The motor D and pump P will thus be started, and will continue to operate until the desired 20" vacuum is attained on the supply side of the heating system.

The mercury switch in the pressure-controlled device 42ª will then be reversed, connecting the wire 41ª through the wires 80 and 81, field coil 82 and valve motor M to the wire 67 and secondary return wire 61. The valve motor M will then be operated in a direction to close the valve V on the supply side of the system, but the pump P will continue to operate until the high vacuum controller 44 opens the double pole switch 75 associated therewith, which will ordinarily be at a little higher vacuum, say 22".

If the plunger 36 (Fig. 1) in the control device A advances to engage the 10" vacuum contact 37ᵇ, the circuit will be similarly closed through the wire 41ᵇ and solenoid 84 to the pressure-controlled switch device 42ᵇ, and back through the wires 64 and 65, field coil 66, motor M and wire 67 to the secondary return wire 61, thus also causing the motor M to rotate in a direction to open the valve V.

Current through the solenoid 84 causes engagement of contacts 87 and 88 which are connected by branch wires 89 and 90 to the wires 73 and 74 in parallel with the contacts 71 and 72 in the 20" circuit. Engagement of the contacts 87 and 88 thus acts to complete the circuit between the high vacuum controller 44 and through the magnetic starter S for the pump P, which will then be operated as previously described, except that the motor M will be reversed by the mercury switch of the pressure-controlled device 42ᵇ when a 10" vacuum is attained on the supply side of the system, but the pump P will continue to operate until shut off by the high vacuum controller 44 at the same high vacuum of 22" previously defined.

If the plunger 36 advances to the 5" vacuum contact 37ᶜ, a circuit is completed through the wire 41ᶜ to the pressure-controlled switch device 42ᶜ, and back through the wires 64 and 65, field coil 66, motor M and wire 67 to the secondary return wire 61, the motor thereupon being operated to open the valve V. The valve motor M is reversed when the mercury switch of device 42ᶜ reverses on attainment of the desired 5" vacuum.

Similarly, engagement of the plunger 36 with the 1 lb. contact 37ᵈ completes the circuit through the wire 41ᵈ and pressure-controlled switch device 42ᵈ to operate the motor M and to open the valve V, and on reversal of the mercury switch of the device 42ᵈ the field coil 82 is energized to reverse the motor M which operates the valve V.

When the plunger 36 is in engagement with contact 37ᶜ or 37ᵈ, the magnetic starter S is also under the direct control of the low vacuum controller 45 and of the float switch 92 which automatically starts the pump P whenever a predetermined amount of condensed steam has accumulated on the return side of the system.

When the plunger 36 engages the contact 37 marked "off", the circuit is completed through the wire 41 to the wire 81 and thence through the field coil 82, which then causes the motor M to close the valve V.

My improved heat-control apparatus thus embodies a control or regulating chamber the outer portion of which is more or less directly responsive to external weather and temperature conditions, and also a reference chamber or a uniformly energized heat-supplying device, and the apparatus operates in accordance with the temperature differential between these elements.

Having thus described my invention and the advantages thereof, I do not wish to be limited to the details herein disclosed, otherwise than as set forth in the claims, but what I claim is:

1. Heat control apparatus effective to maintain a predetermined and substantially constant temperature within a building under varying outside weather conditions, said apparatus including a heat-insulated casing located wholly within said building but abutting an outside wall and having one interior chamber within which the temperature varies in definite relation to changes in outside weather and temperature conditions, means to provide restricted communication between said interior chamber and the outer atmosphere, a second interior chamber in heat-transmitting communication with said first-named chamber and provided with a heating unit of substantial capacity and constantly and uniformly energized, and heat control devices for said building including a regulating part responsive to changes in temperature at a predetermined point in said first-named interior chamber.

2. Heat control apparatus effective to maintain a predetermined and substantially constant temperature within a building under varying outside weather conditions, said apparatus including a heat-insulated casing located wholly within said building but abutting an outside wall and having one interior chamber within which the temperature varies in definite relation to changes in outside weather and temperature conditions, and having a second interior chamber in heat-transmitting communication with said first-named chamber and provided with a heating unit of substantial capacity and constantly and uniformly energized, and heat controlling devices for said building including a thermostat positioned in said first-named interior chamber and responsive to changes in temperature at a predetermined point in said first-named interior chamber.

3. Heat control apparatus effective to maintain a predetermined and substantially constant temperature within a building under varying outside weather conditions, said apparatus including a heat-insulated casing located wholly within said building but abutting an outside wall and having one interior chamber within which the temperature varies in definite relation to changes in outside weather and temperature conditions, means to restrict communication between said interior chamber and the outer atmosphere, a uniformly energized electrical resistance heating device by which a second interior chamber of said casing is constantly heated, said first and second chambers being in heat-transmitting communication, and heat control devices for said building including a regulating part responsive to changes in temperature at a predetermined point in said first-named interior chamber.

4. Heat control apparatus effective to maintain a predetermined and substantially constant temperature within a building under varying outside weather conditions, said apparatus including a heat-insulated casing located wholly within said building but abutting an outside wall and having one interior chamber within which the temperature varies in definite relation to changes in outside weather and temperature conditions, and having a second interior chamber in heat-transmitting communication with said first-named chamber and provided with a heating unit of substantial capacity and constantly and uniformly energized, a circuit-shifting device connected to control the heat supply for said building, and a thermostat to operate said shifting device, said shifting device and said thermostat being both positioned in said first-named interior chamber and having direct mechanical operating connection, and said thermostat being responsive to changes in temperature at a predetermined point in said first-named interior chamber.

5. Heat control apparatus effective to maintain a predetermined and substantially constant temperature within a building under varying outside weather conditions, said apparatus including a heat-insulated casing located wholly within said building but abutting an outside wall and having one interior chamber within which the temperature varies in definite relation to changes in outside weather and temperature conditions, and having a second interior chamber in heat-transmitting communication with said first-named chamber and provided with a heating unit of substantial capacity and constantly and uniformly energized, a heat control device for said building including a regulating part positioned at and responsive to changes in temperature at a predetermined point in said first-named interior chamber, and a partition between said two interior chambers through which a relatively slow interchange of heat can take place.

6. Heat control apparatus effective to maintain a predetermined and substantially constant temperature within a building under varying outside weather conditions, said apparatus including a heat-insulated casing located wholly within said building but abutting an outside wall and having one interior chamber within which the temperature varies in definite relation to changes in outside weather and temperature conditions, and having a second interior chamber in heat-transmitting communication with said first-named chamber and provided with means to supply heat thereto at a substantially constant rate, and a heat control device for said building including a thermostat positioned at and responsive to the temperature at a predetermined point in said first-named interior chamber.

IRVING C. JENNINGS.